G. W. CRUPE.
DISTILLING COLUMN.
APPLICATION FILED OCT. 23, 1920.

1,372,649.

Patented Mar. 22, 1921.

Inventor.
George W. Crupe
by his atty Clarkson A. Collins

UNITED STATES PATENT OFFICE.

GEORGE W. CRUPE, OF BUFFALO, NEW YORK, ASSIGNOR TO SEMET-SOLVAY COMPANY, OF SOLVAY, NEW YORK, A CORPORATION OF NEW YORK.

DISTILLING-COLUMN.

1,372,649.      Specification of Letters Patent.      Patented Mar. 22, 1921.

Application filed October 23, 1920. Serial No. 418,966.

*To all whom it may concern:*

Be it known that I, GEORGE W. CRUPE, a citizen of the United States, residing at Buffalo, in the county of Erie and State of New York, have invented a new and useful Improvement in Distilling-Columns, of which the following is a specification.

My invention relates to that class of apparatus in which a volatile content of a liquid, as ammonia, is distilled off therefrom by passing steam through the liquid. The column in which such distillation is effected is composed of a series of superposed pans contained within an exterior shell and the liquid flows down from pan to pan, passing from each pan to the one below, through an overflow passage, while the steam passes up through the column, bubbling through the liquid in each pan and carrying with it the component to be eliminated or recovered.

In the operation of such a column it sometimes happens that the liquor admitted at the top of the column does not flow freely therethrough but accumulates to an abnormal depth in the pans composing it, thus checking up the upward flow of steam and, to a greater or less extent, blocking the operation.

I have discovered that this difficulty is due to the fact that the steam rising from the boiling liquid in the overflow passages opposes the flow of liquid from the pans to the passages to such an extent that the flow of liquid is checked thus increasing the depth of liquid in the pans. This increase in the depth of the liquid seal in the pans tends to prevent the steam passing up through the column from following its normal path and to cause it to break through into the overflow passages, thus increasing the original difficulty. To the end of obviating this defect in operation my invention consists in combining with the overflow passage a supplementary steam outlet leading from the upper part of the overflow passage to the space under the faux fond of the pan above, that is above the opening from the pan into the passage, so that the steam is enabled to pass off without any tendency to prevent the flow of the liquor into the overflow passage.

Figure 1:
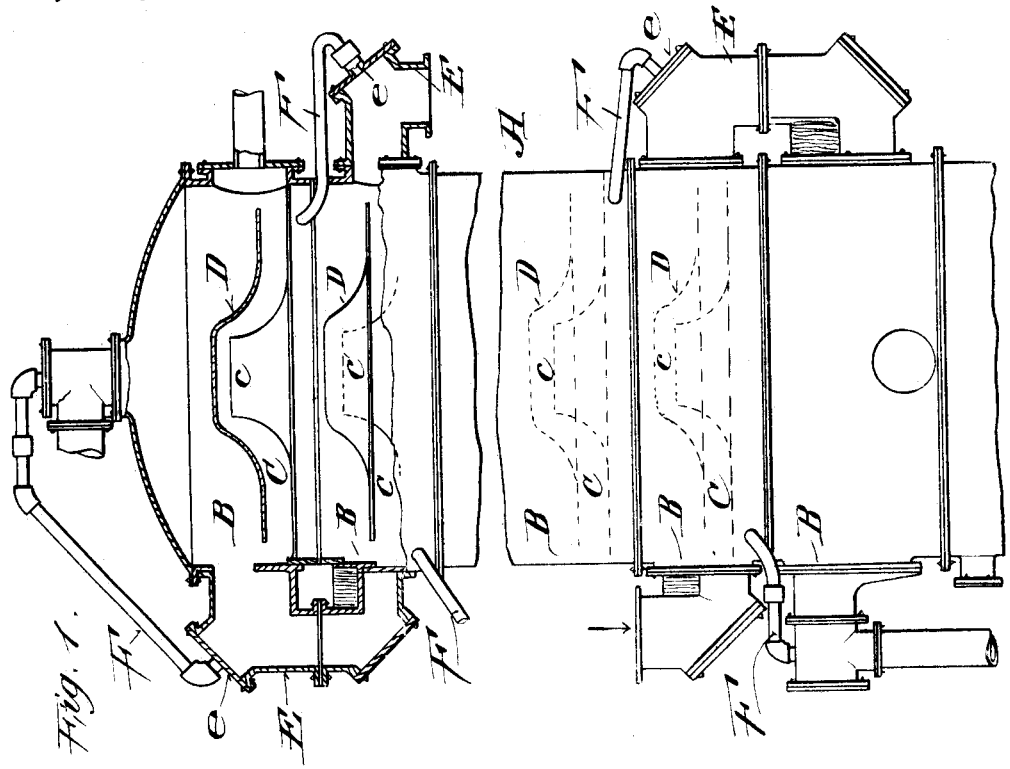
Figure 2:
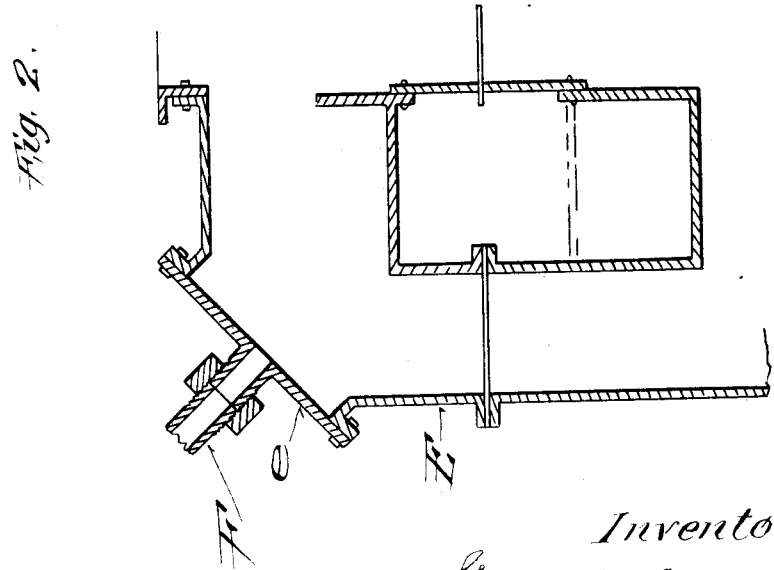

The invention will be best understood by reference to the accompanying drawings, Figure 1 of which shows a vertical section of a distilling column in which it is embodied and Fig. 2 a section of the overflow passage and steam vent on an enlarged scale. Referring to the drawing, A, indicates a distillation column, composed of a series of superimposed rings, B, B. In each ring is a pan, or faux fond, C, having a central opening, *c*, over which is a hood, or passette, D, whereby steam passing up through the column and through the openings, *c*, is forced to pass through the liquor in the pans. Leading from each pan to the pan below is an overflow pipe or passage, E, whereby the liquor, overflowing from the several pans passes downward from pan to pan, through the column. Connected with upper part of each of the overflow pipes, E, and preferably with the cover plate, *e*, of the overflow pipe, is a vent pipe, F, the upper, or discharge, end of which is above the inlet opening of the overflow pipe and preferably directly under the pan or faux fond of the next succeeding ring above.

In the operation of the device the steam rising from the highly heated liquor in the overflow passage, E, is free to discharge through the vent pipe, F, instead of passing through the inlet opening of the overflow pipe, E, and thus is prevented from obstructing the flow of liquor into the overflow pipe. By this means a more rapid feed of liquor to the column is made possible and, with a uniform feed of liquor a substantially constant depth of liquor is maintained in each pan, thus insuring uniformity and cleanness of operation, the advantages of which will be readily understood by those skilled in the art.

What I claim as new and desire to secure by Letters Patent is:—

In a distilling column composed of a series of superposed pans having an overflow passage exterior of the column from pan to pan, the combination with said overflow passage of a vent pipe connected with the upper part of the passage and having a discharge orifice within the column and above the opening from the pan to the passage.

In testimony whereof I affix my signature this 15th day of October, 1920.

G. W. CRUPE.